United States Patent [19]

Kamaya et al.

[11] Patent Number: 5,537,175
[45] Date of Patent: Jul. 16, 1996

[54] CAMERA ADAPTION FOR SELF PHOTOGRAPHY

[75] Inventors: Naoki Kamaya; Kazuo Yamakawa; Yoshiyuki Umehara, all of Tokyo; Hiroshi Mamiya, deceased, late of Tokyo, by Haruko Mamiya, legal representative; Tooru Akutagawa, Kanagawa, all of Japan

[73] Assignee: Sony Corporation, Japan

[21] Appl. No.: 301,997

[22] Filed: Sep. 7, 1994

[30]  Foreign Application Priority Data

Sep. 9, 1993  [JP]  Japan .................................. 5-223759

[51] Int. Cl.[6] ............................................ G03B 13/02
[52] U.S. Cl. ............................................ 354/220
[58] Field of Search ............................. 354/220, 227.1

[56]  References Cited

U.S. PATENT DOCUMENTS

| | | | |
|---|---|---|---|
| 1,099,820 | 12/1912 | Ridings | 354/220 |
| 3,942,864 | 3/1976 | Numbers | 350/65 |
| 4,168,429 | 9/1979 | Lough | 250/330 |
| 4,490,029 | 12/1984 | Tanaka et al. | 354/106 |
| 4,560,261 | 12/1985 | Ueda et al. | 354/121 |
| 4,591,253 | 5/1986 | Hecker et al. | 354/227.1 |
| 4,714,962 | 12/1987 | Levine | 358/209 |
| 4,891,660 | 1/1990 | Biondo, Jr. | 354/412 |
| 4,971,592 | 11/1990 | Carcia, III | 446/219 |
| 4,999,657 | 3/1991 | Lever | 354/220 |
| 5,023,638 | 6/1991 | Siegesleuthner et al. | 354/126 |

FOREIGN PATENT DOCUMENTS 63-178962  11/1988  Japan .

*Primary Examiner*—Michael L. Gellner
*Assistant Examiner*—C. Mahoney
*Attorney, Agent, or Firm*—Ronald P. Kananen

[57]  ABSTRACT

A camera is adapted for self photography by provision of a reflective element disposed over a image receiving means thereof. The reflective element is disposed along or proximate to the focal axis of the image receiving portion for avoiding a parallax effect such that a camera operator may accurately monitor the image during self photography. Several variations on the arrangement of the reflective element allow various photographic effects to be obtained and in addition, the arrangement of the invention may also by applied for effecting audio/visual communication.

10 Claims, 20 Drawing Sheets

5,537,175

CAMERA ADAPTION FOR SELF PHOTOGRAPHY

BACKGROUND OF THE INVENTION

Field of the Invention

The present invention relates to a camera including a reflective element which acts as a visual reference when a user per se wishes to appear in what is recorded while simultaneously carrying out the actual recording process.

Description of the Related Art

Recently cameras have been introduced in which a picture taking lens thereof may be swiveled in the direction of the camera operator, a video camera of this type has been disclosed in Japanese Patent Application 63-178962. Such a video camera will be explained briefly with reference to FIGS. 34, 35(a) and 35(b).

A video camera 100 has a monitor 102, such as a color LCD screen mounted on a rear side thereof. The video camera further includes video cassette deck 103 and a VTR portion 101. The upper section of the VTR 101 has a recessed portion 101a formed therein, according to this, a lens housing 104 is pivotally mounted so as to be enabled to swivel in forward and rearward directions according to turning of a swivel know 105 mounted on the pivotal axis adjacent the lens housing 104. Referring to FIG. 36, the lens housing 104 mounts an optical lens, CCD, or the like 106 therein in a lens barrel 104a at a forward portion of the lens housing.

According to this arrangement, as shown in FIGS. 35(a) and 35(b) a camera operator may swivel the lens housing such that the lens barrel is pointed in the direction of the camera operator such that the operator may photograph him or herself while viewing the viewing field of the lens 106 via the LCD monitor 102. Conversely, to operate the camera in a conventional fashion, the camera operator may swivel the lens housing in a direction away from him/herself such that the lens barrel 104a if pointed away from the camera operator while the viewing field of the lens 106 is visible in the LCD 102 which still faces in the direction of the camera operator. Thus, the (LCD) monitor 102 may act as a viewfinder for the camera as well as a monitor for viewing recorded images.

However, according to the above, provision of such an LCD monitor increases the cost of such a camera and in addition, the swivel arrangement of the lens housing increases the size and weight of the camera overall.

Also, as will be noted from FIG. 35(b), the optical axis of the lens barrel 104a when swiveled in the direction of the camera operator for self-picture taking, is offset from the optical axis of the LCD 102 thus creating a parallax effect and making is difficult for the operator to compose the viewing field of the lens 106 while simultaneously monitoring the output image on LCD 102.

Thus there has been a need for a camera which enables a camera user to photograph (or video tape) him or herself easily by means of a simple, compact camera arrangement.

SUMMARY OF THE INVENTION

It is therefore a principal object of the present invention to overcome the drawbacks of the related art.

It is a further object of the present invention to provide a lightweight, low cost camera which easily enables self-photography and which may minimize a parallax effect such that such self photography process is simplified.

In order to accomplish the aforementioned and other objects, in a camera constructed such that, during operation, an image receiving means thereof, mounted on a main body of said camera, is interposed between the main body and a subject to be photographed, an improvement is provided, comprising:

a reflective element, disposed in relation to the image receiving means such that a viewing field within a range detectable by the image receiving means is substantially visible in the reflective element also.

For a camera so constructed such that during photographic operation an image receiving means mounted on a main body of the camera is interposed between the main body and a subject to be photographed, an attachment comprising:

a reflective element, disposed in relation to the image receiving means such that a viewing field within a range detectable by the image receiving means is substantially visible in the reflective element also.

BRIEF DESCRIPTION OF THE DRAWINGS

In the drawings:

FIG. 13(b) is a perspective view of a monitor image corresponding to this arrangement;

Figure 16:
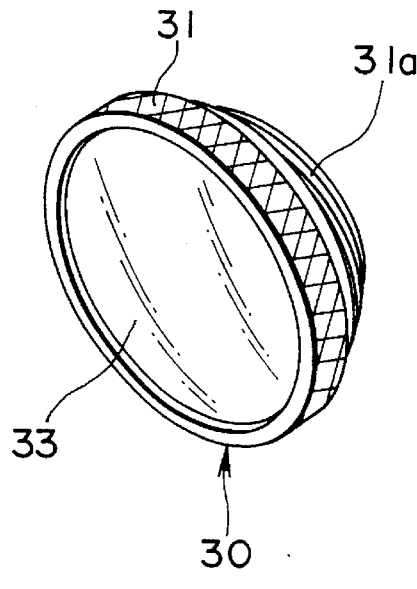
Figure 16:
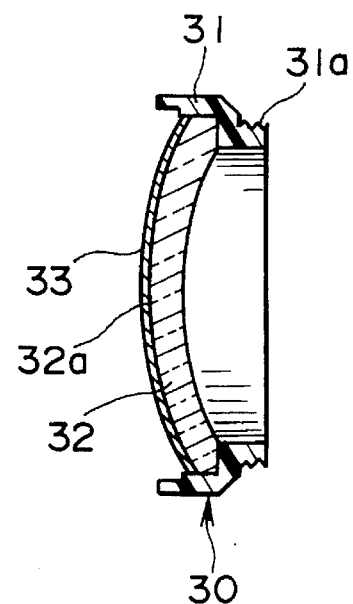
Figure 17:
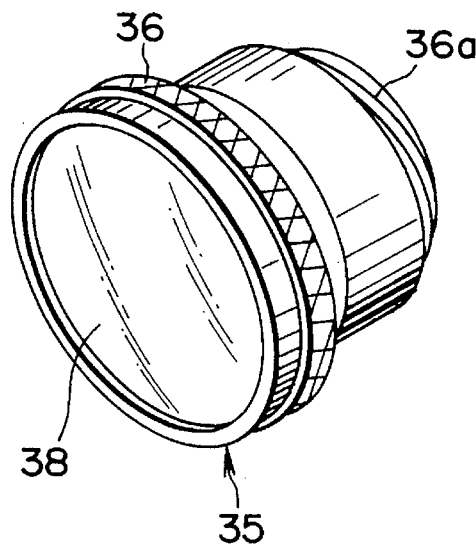
Figure 17:
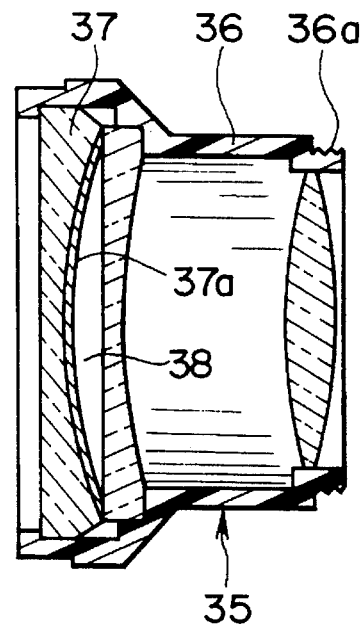
Figure 18:
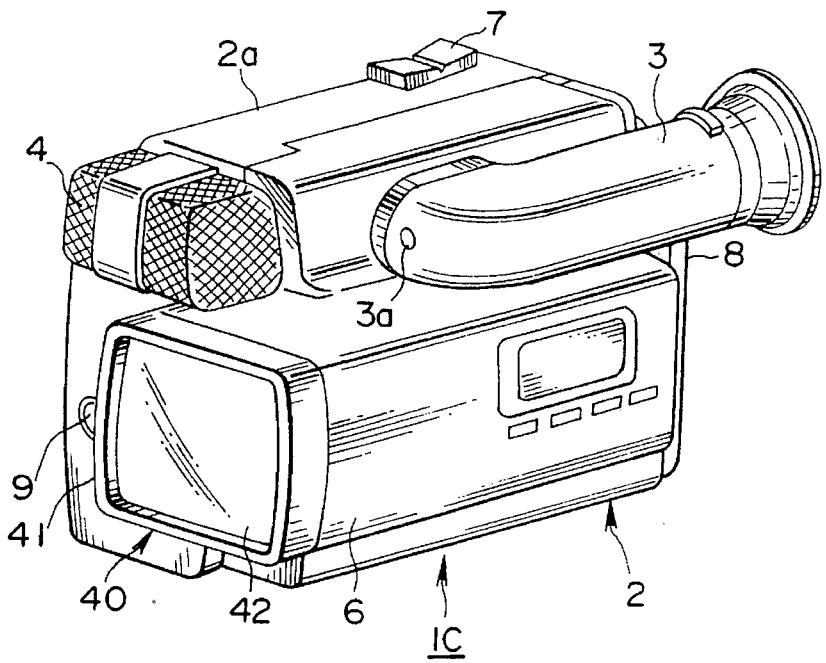
Figure 19:
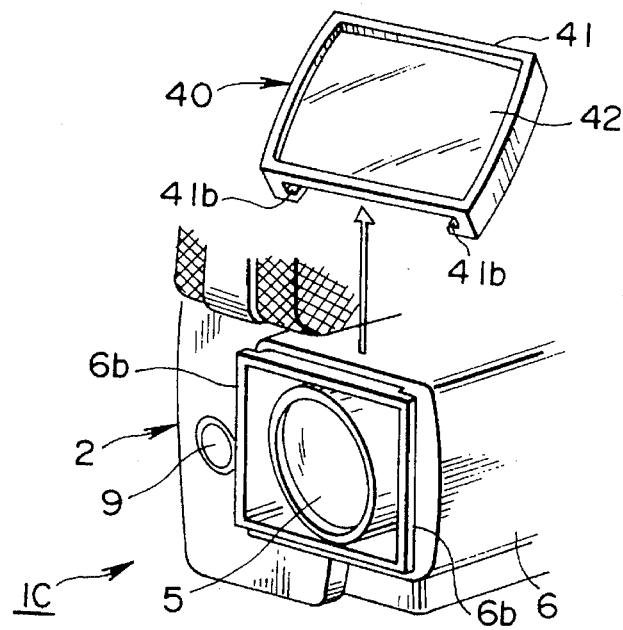
Figure 20:
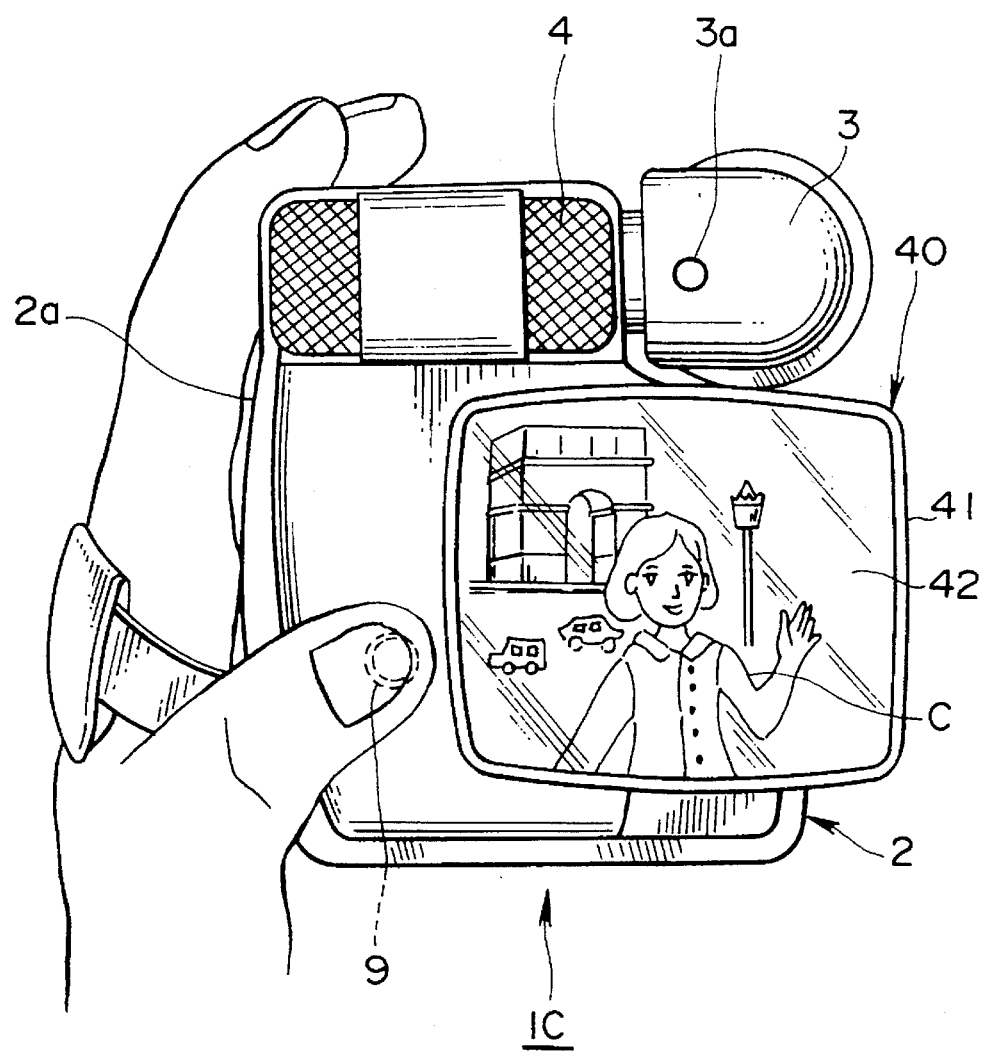
Figure 21:
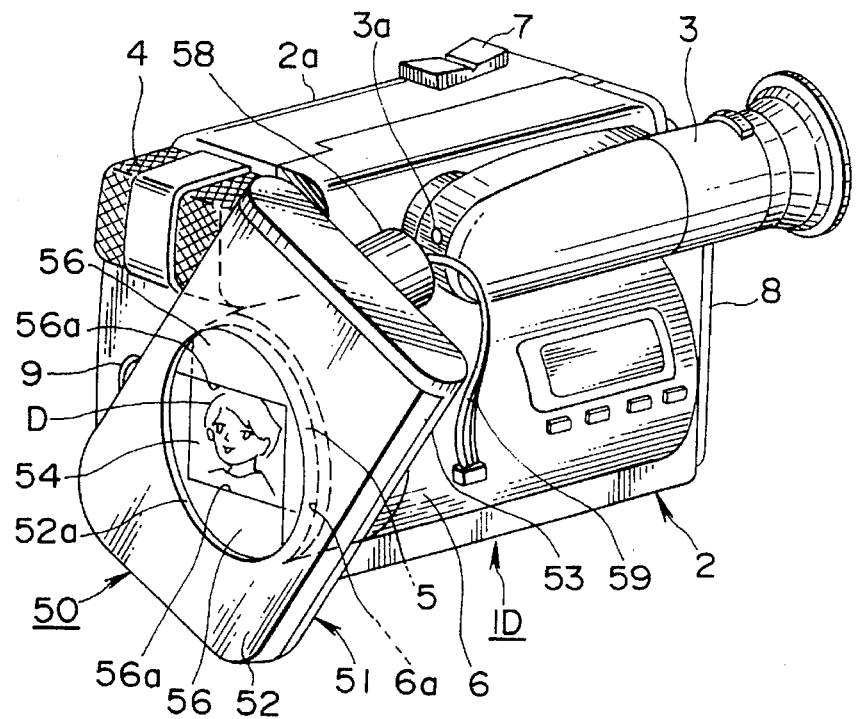
Figure 22:
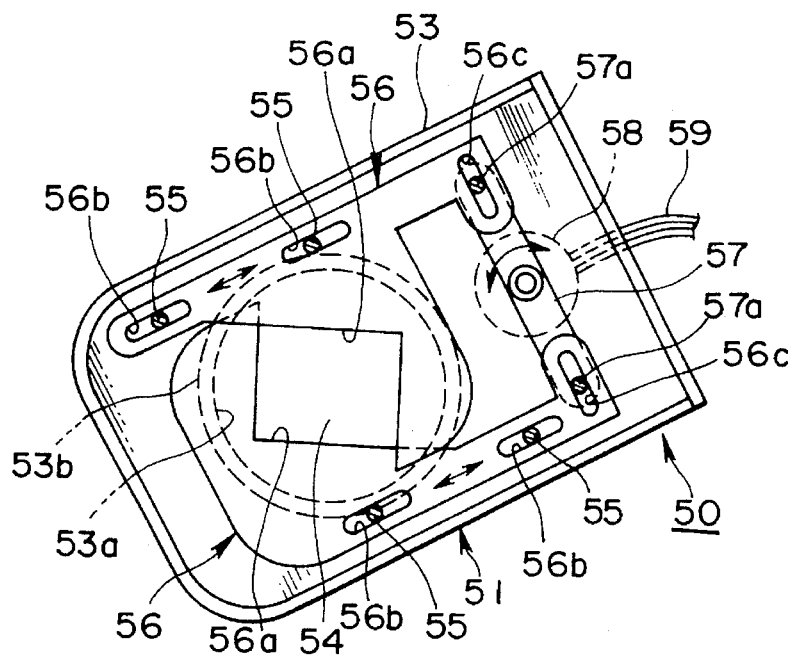
Figure 23:
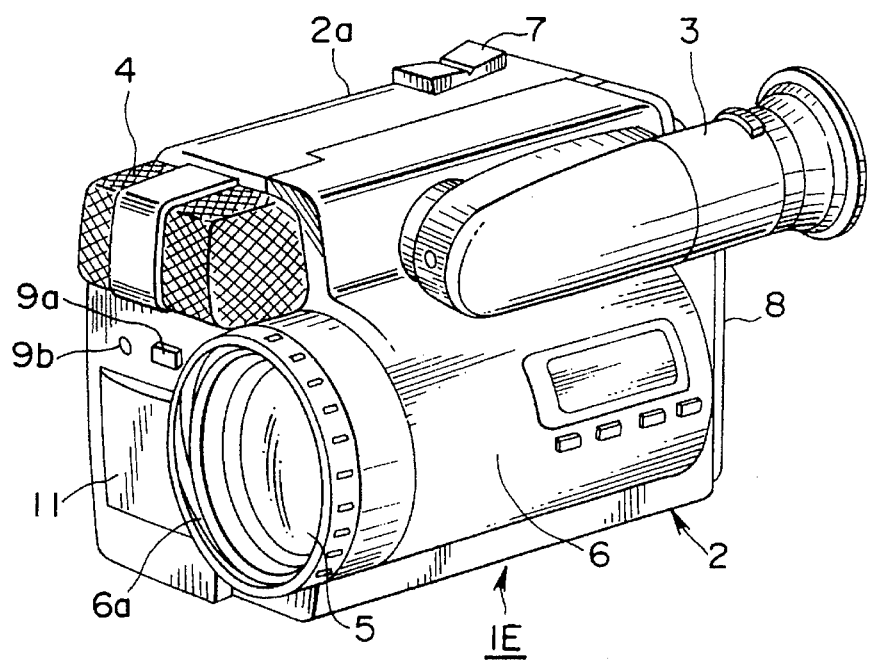
Figure 24:
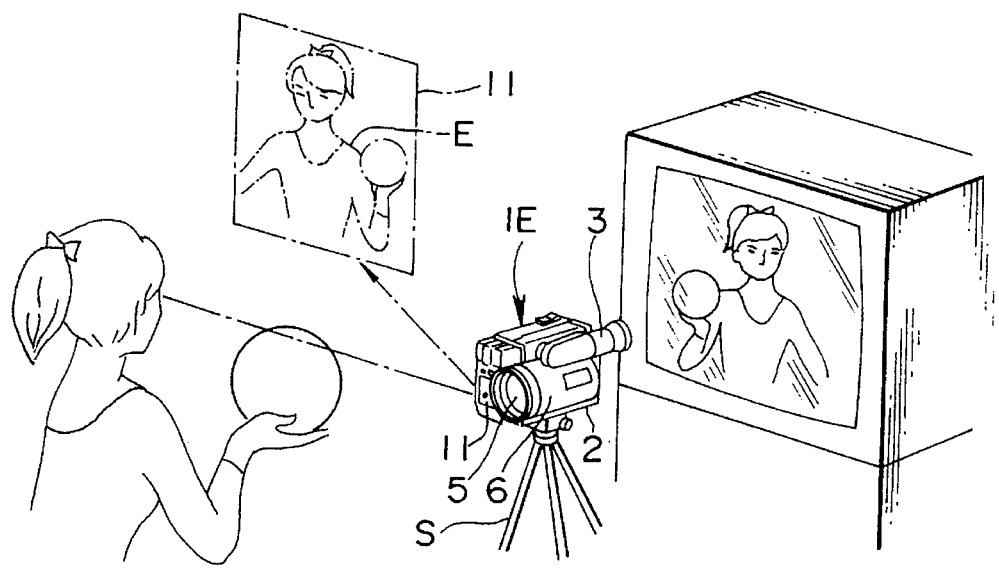
Figure 25:
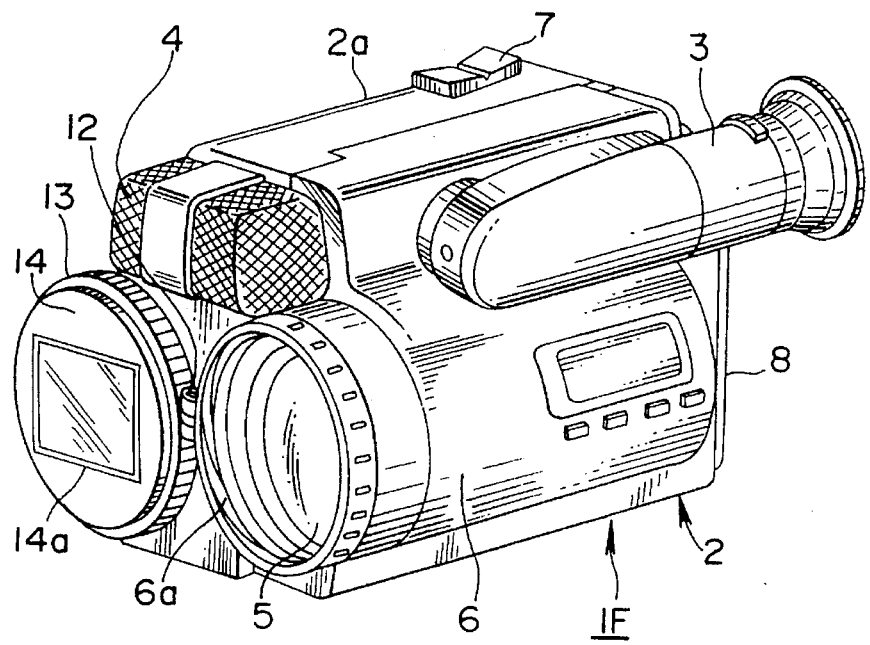
Figure 26:
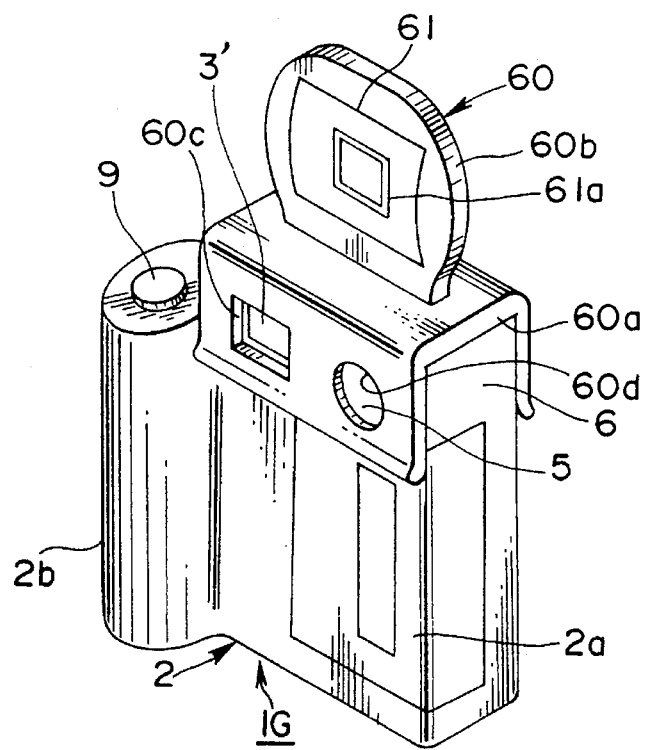
Figure 27:
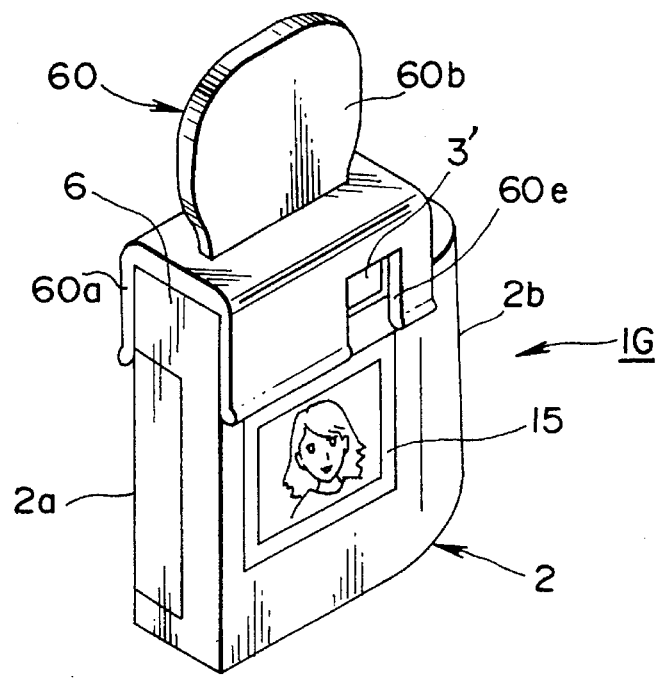
Figure 28:
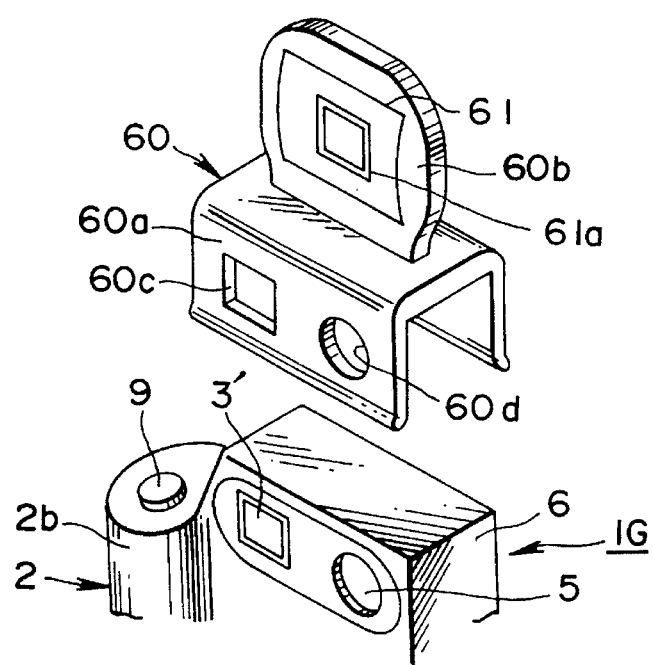
Figure 29:
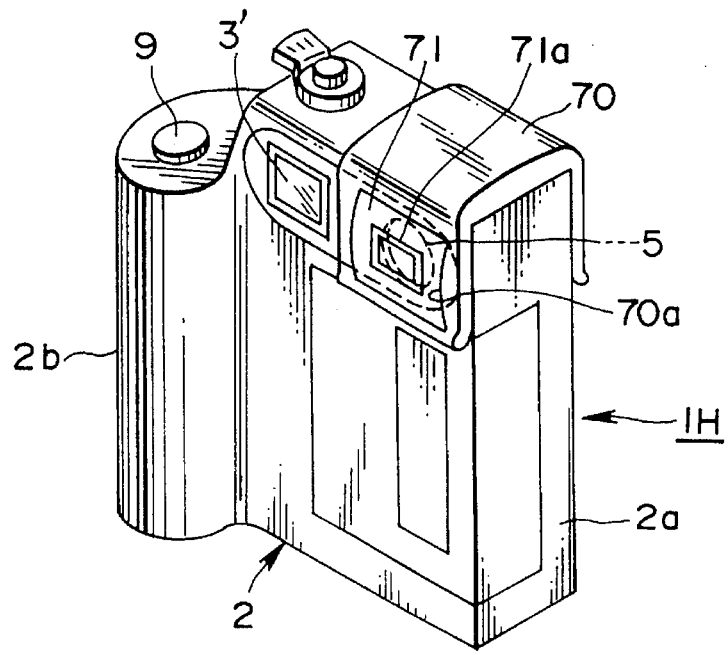
Figure 30:
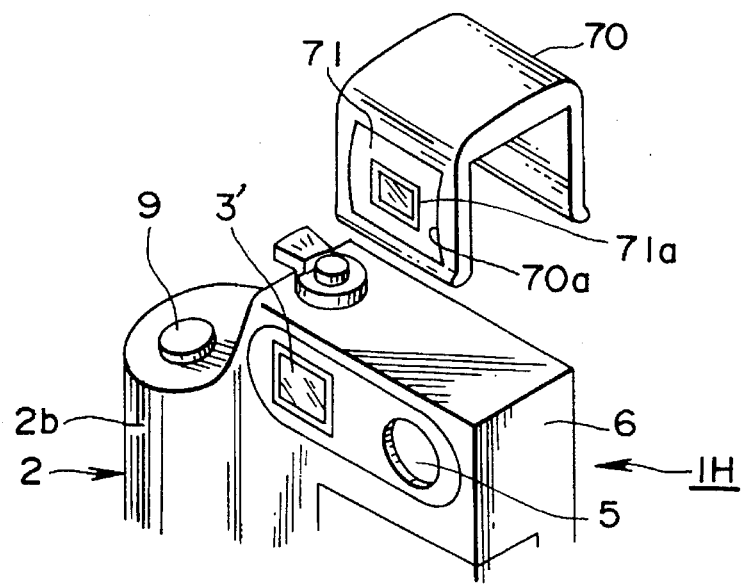
Figure 31:
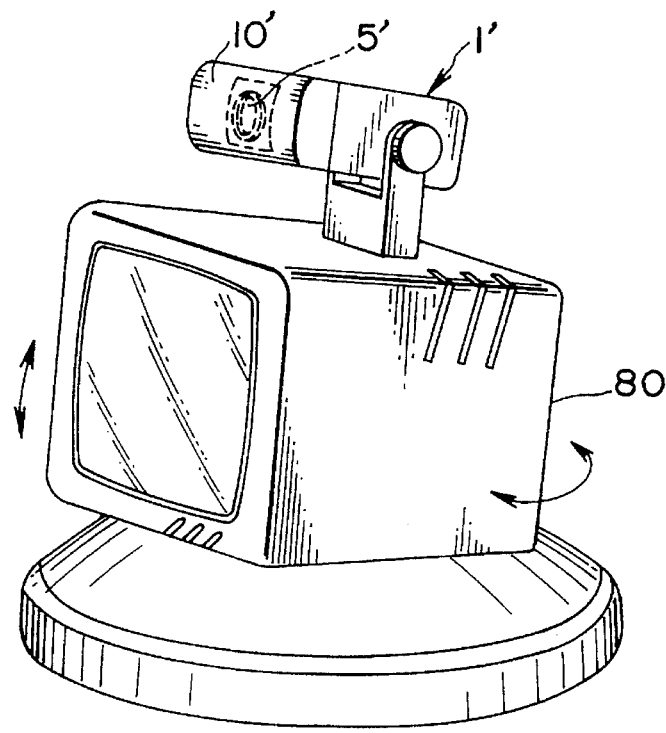
Figure 32:
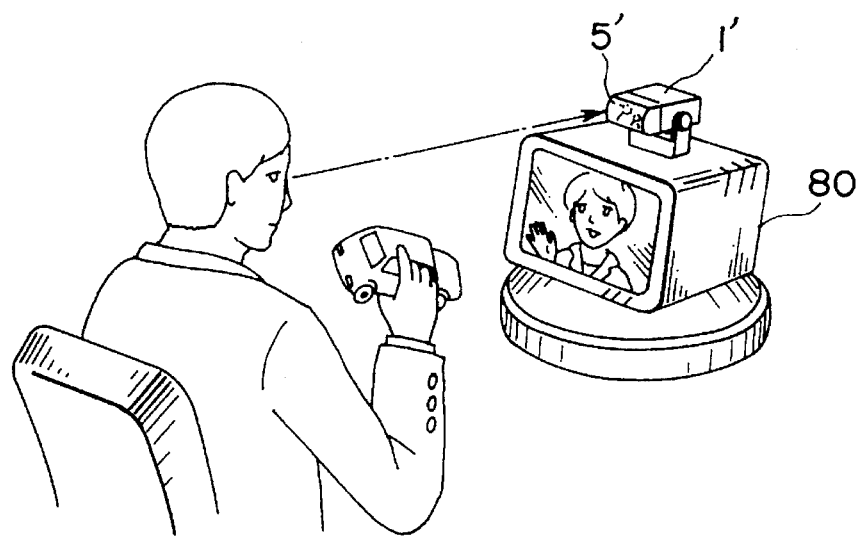
Figure 33:
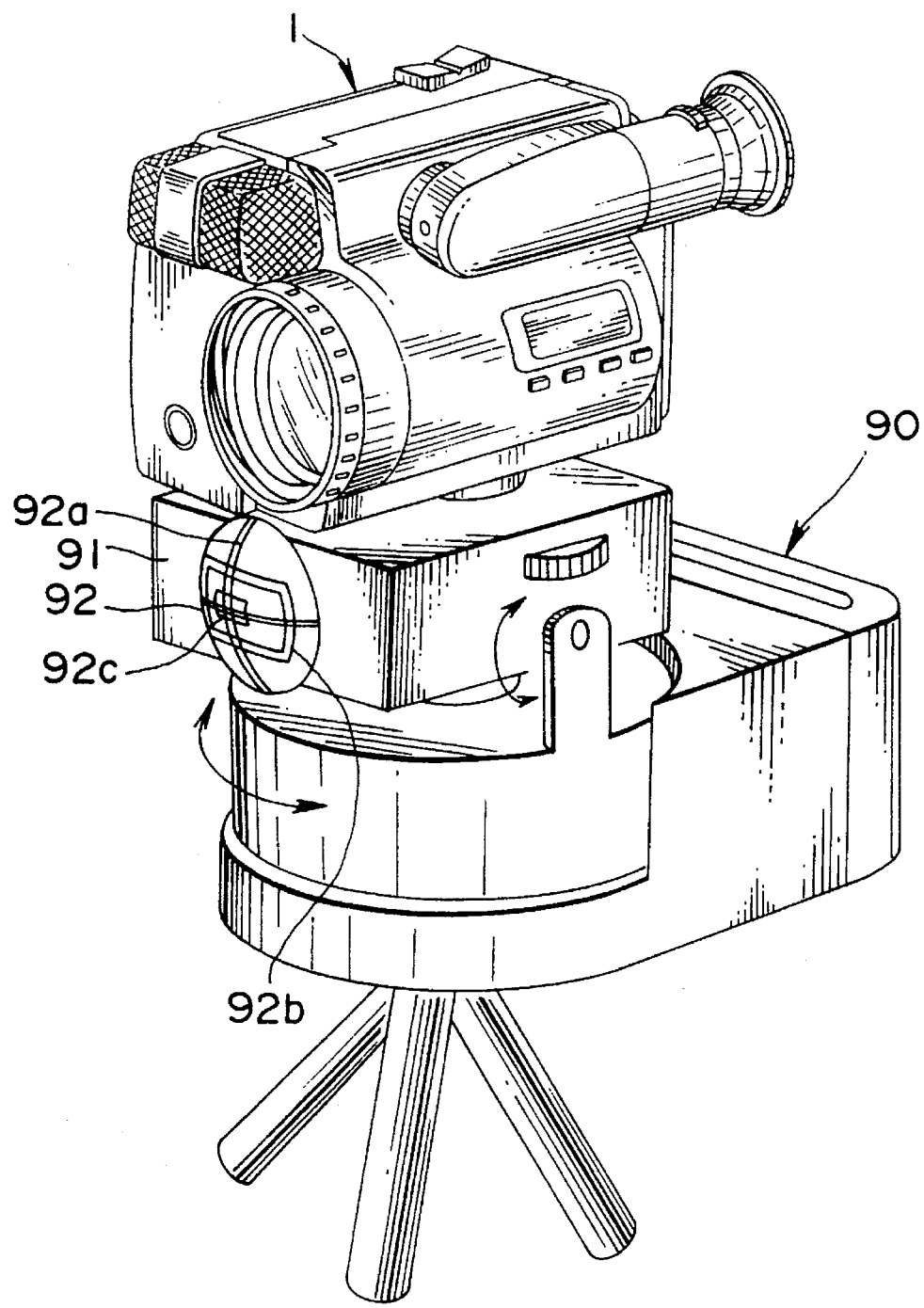
Figure 34:
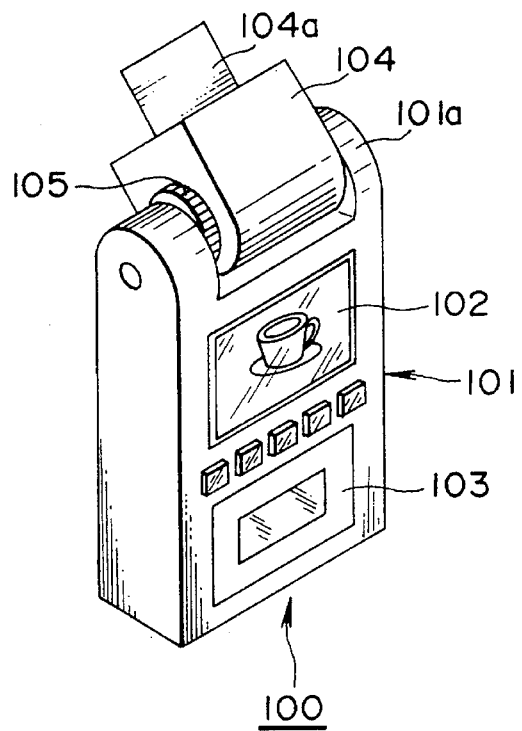
Figure 35:
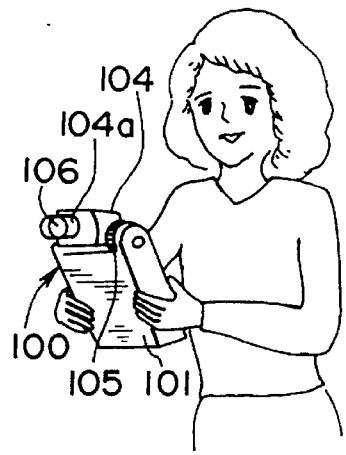
Figure 35:
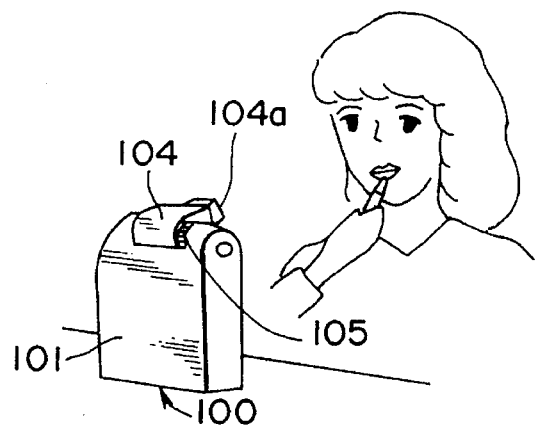

14(b) is a perspective view of a monitor image corresponding to this arrangement;

FIGS. 15(a)–15(d) show a sixth modification of the convex mirror portion of the second embodiment showing various lens covering sheets which may be used to vary the size of the viewing field of the lens;

FIG. 16 comprised of FIGS. 16a–16b shows a perspective view of an seventh modification of the convex mirror portion of the second embodiment, FIG. 16(b) is a cross-sectional view FIG. 16;

FIG. 17 comprised of FIGS. 17a–17b shows a perspective view of an eighth modification of the convex mirror portion of the second embodiment, FIG. 17(b) is a cross-sectional view FIG. 16;

FIG. 18 shows a third embodiment of the camera to the invention;

FIG. 19 is an enlarged perspective view of a main portion of the camera of the third embodiment of FIG. 18;

FIG. 20 is a front view of the camera of the third embodiment while in use;

FIG. 21 is a perspective view of a fourth embodiment of a camera according to the invention;

FIG. 22 is a plan view of the structure of a convex mirror portion of the camera of the fourth embodiment;

FIG. 23 shows a perspective view of a fifth embodiment of a video camera according to the invention;

FIG. 24 is a perspective view of the video camera of the fifth embodiment while in use;

FIG. 25 shows a perspective view of a sixth embodiment of a video camera according to the invention;

FIG. 26 shows a perspective view of a seventh embodiment of a camera according to the invention;

FIG. 27 shows a perspective view of a rear side of the camera of the seventh embodiment;

FIG. 28 is a perspective view of a detail portion the structure of the camera of the seventh embodiment of FIG. 26;

FIG. 29 shows a perspective view of an eighth embodiment of a camera according to the invention;

FIG. 30 is a perspective view of a detail portion the structure of the camera of the eighth embodiment of FIG. 29;

FIG. 31 shows a perspective view of a ninth embodiment of a video camera according to the invention;

FIG. 32 is an explanatory perspective view of the camera of the ninth embodiment while in use;

FIG. 33 is an illustrative example of one possible application applicable to a camera according to the invention;

FIG. 34 is a perspective of a conventional video camera having self-photography capability discussed in the opening paragraphs of this disclosure; and FIGS. 35(a) and 35(b) are explanatory illustrations showing the modes of utilization of the conventional video camera of FIG. 34.

DESCRIPTION OF THE PREFERRED EMBODIMENT

Figure 1:
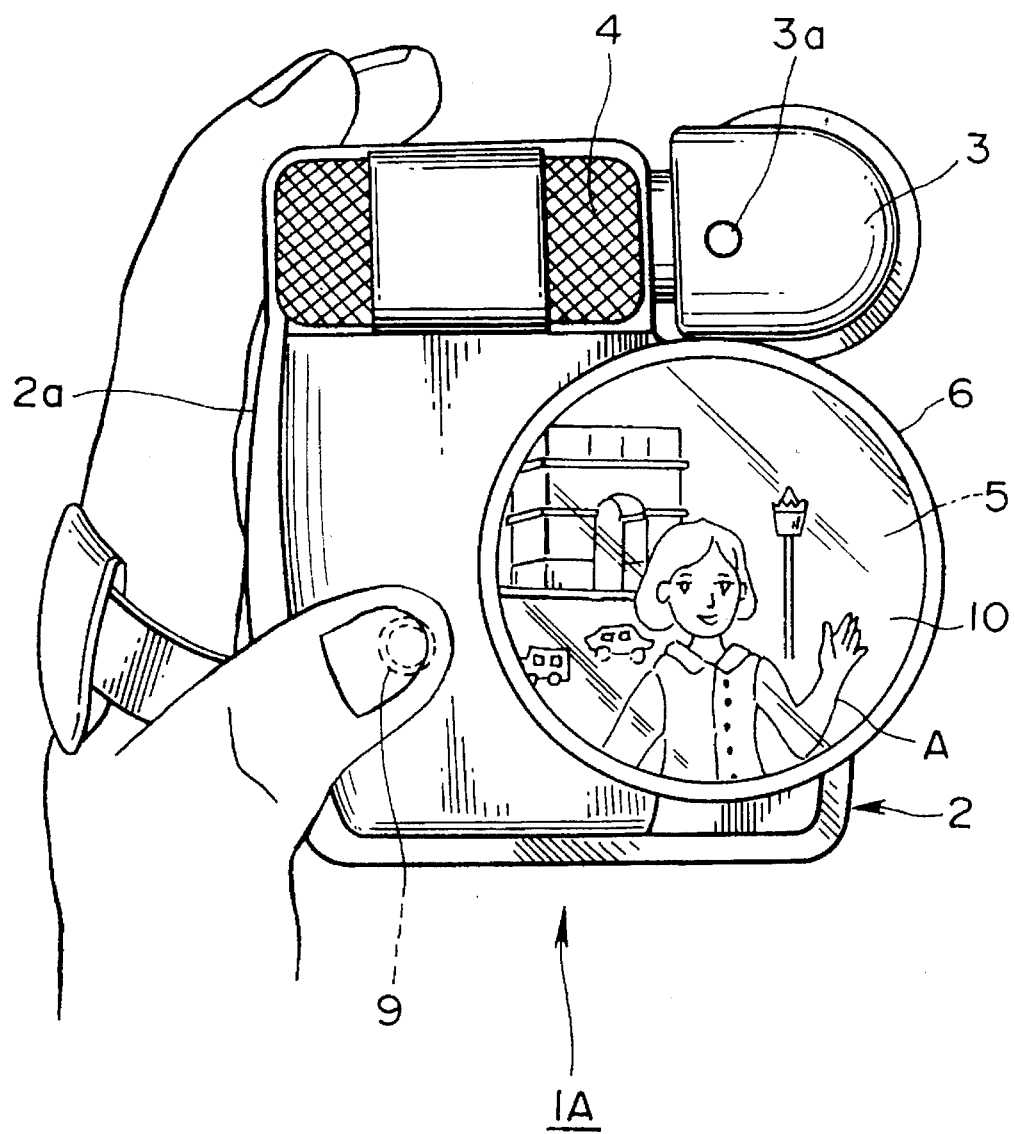
FIG. 1 is a front view of a first preferred embodiment of a video camera according to the invention.
Figure 2:
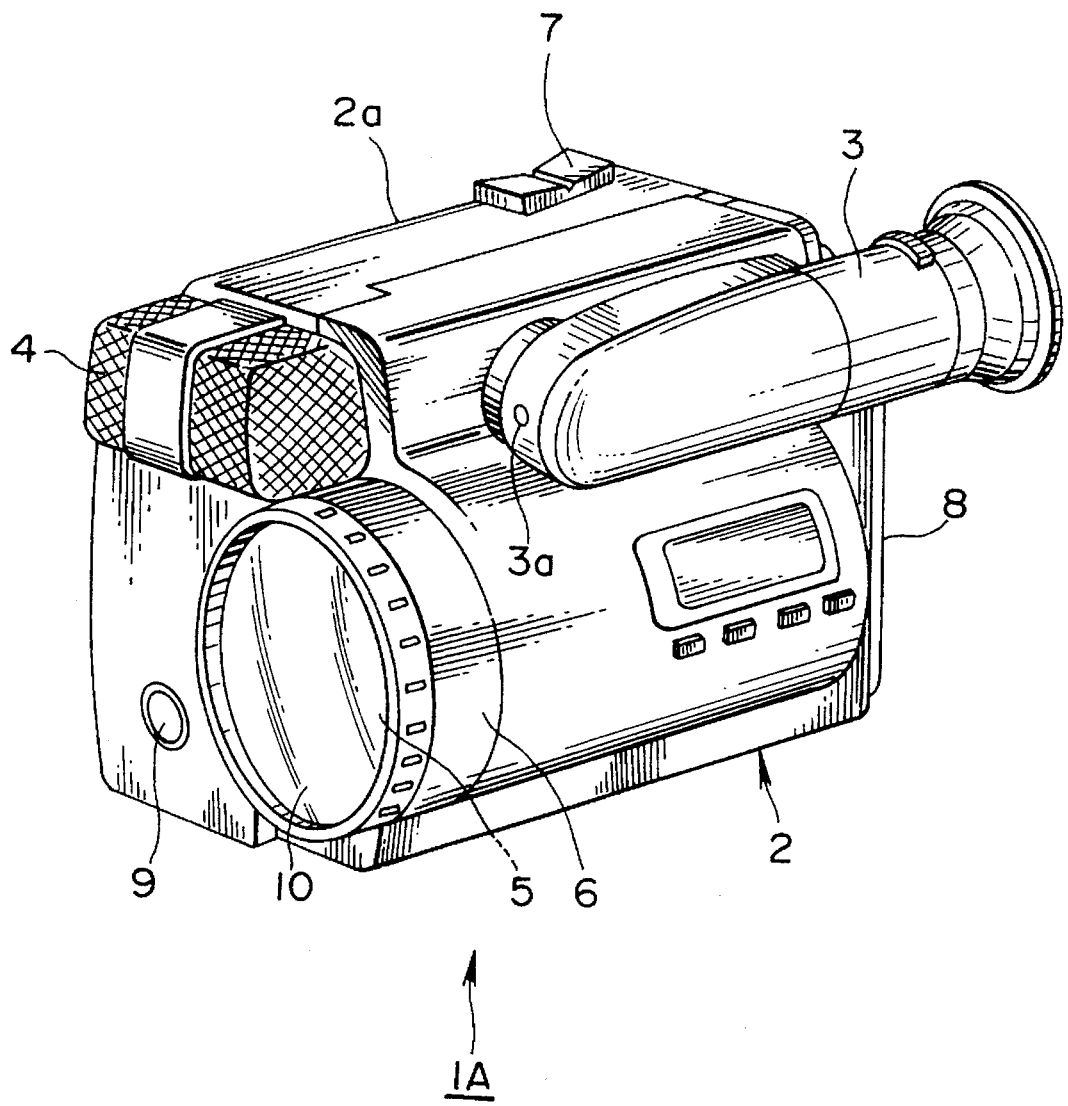
FIG. 2 is a perspective view of the video camera of FIG. 1.
Figure 3:
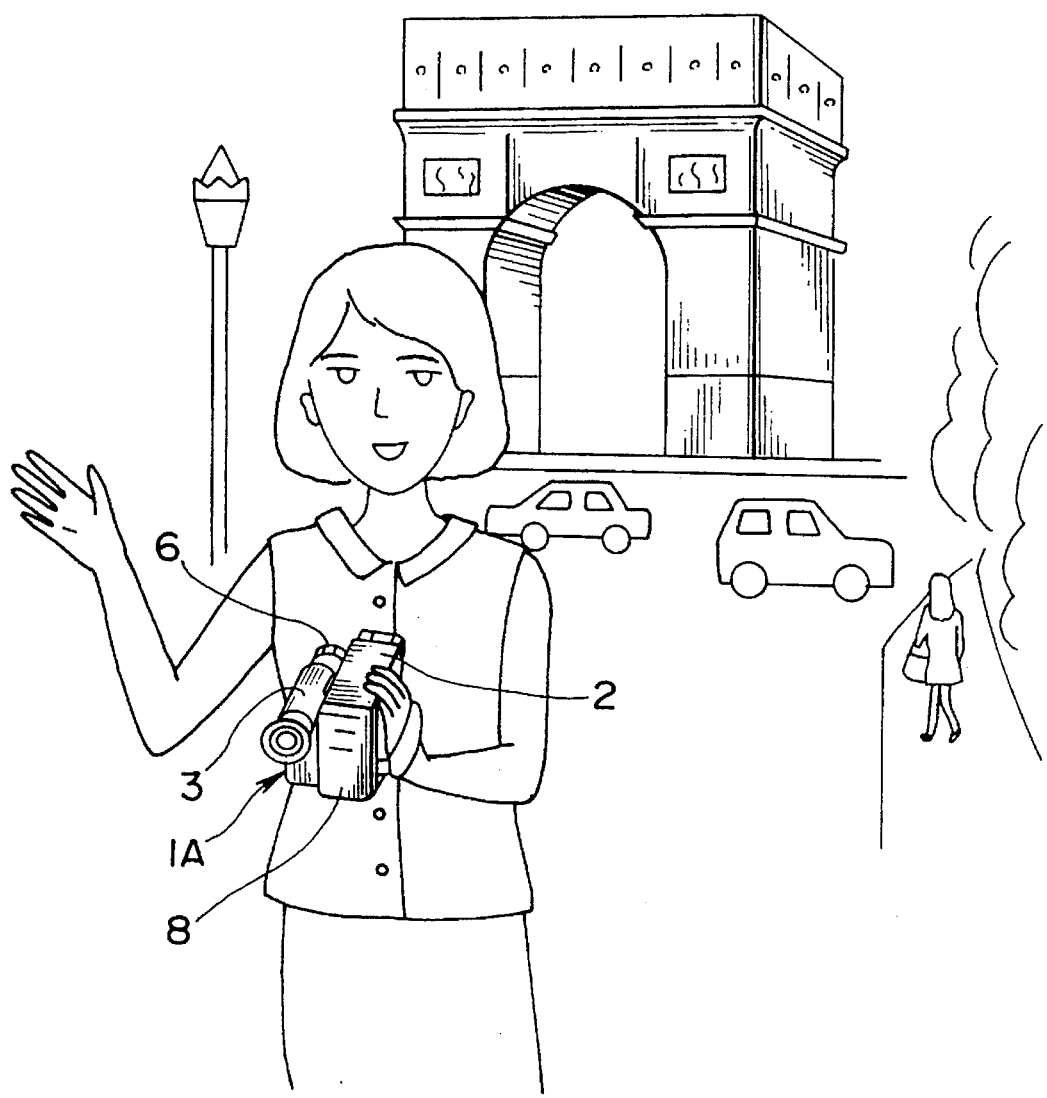
FIG. 3 is an illustration of the camera of the embodiment in use for self-photography.

Referring now to the drawings, particularly to FIGS. 1–3, a first preferred embodiment of a video camera 1A according to the invention will be described hereinbelow in detail.

Referring to the drawings, such a portable video camera 1A generally includes a camera body 2 having disposed thereon a viewfinder 3 for viewing a subject 15 image to be recorded (photographed, videotaped, etc.), a microphone 4 for recording sound during taping (image recording) operations and an image detecting element 5. Hereinbelow the image detecting element will be referred to generally as a lens 5 which term will be understood to apply to an optical lens, a charged coupled device (CCD) or any other image pickup means. The lens is housed in a cylindrical lens barrel 6 and, as seen in FIG. 2, the upper surface of the camera body is provided with a zoom control 7 for controlling a depth of focus of the lens 5. Although not shown in the drawings, the rear side of the camera body 2 may include a start stop switch and/or other components, as well as a battery pack 8 (FIG. 3). Attached to the camera body 2 at one side thereof a grip portion or strap (not shown) may be provided for carrying and aiming the camera while in use. In addition, a portion of the camera body 2 of the video camera of the embodiment comprises a video tape recorder (VTR) 2a and a cassette or tape deck (not shown) for loading and unloading magnetic tape on which to record video images.

According to the present embodiment, the video camera 1A is further provided with a start/stop switch or self-actuating means 9 at a front side of the camera body 2. According to this, self-photography is simplified, that is, when the video camera 1A is held 'backward', such that the lens 5 is facing the camera operator, image taping operation may be initiated by simply pressing the start/stop switch 9, while pressing the switch 9 a second time will stop taping operation, since the start/stop switch 9 is in front and closely adjacent the lens 5, ease of operation is assured. For further enhancing ease of use, the video camera 1A may be set such that, when image recording is initiated via the front start/stop button 9, the zoom function normally regulated by the zoom control 7 is automatically set to its widest angle, that is to provide the widest possible field of view the lens 5. At the front side of the viewfinder 3, a battery lamp is disposed so as to indicate to the operator, or a subject facing the camera, that the video camera 1A is running.

In addition, according to the present embodiment, the lens 5 is formed as a half mirror 10. The half mirror 10 may by formed by vapor deposition, or other means, on an outer surface of the lens 5, which is formed so as to be convex in contour. Thus, it will be appreciated that the half mirror 10 is convex. It will further be noted that, according to various types of available video cameras having various technical features and levels of complexity, the lens 5 may in fact be comprised of a plurality of lenses (not shown) or image pickups (not shown) coaxially mounted in the lens barrel 6. Thus, the convex feature noted above will be understood to apply to the half mirror 10 comprising the convex outer surface of that lens 5 which is mounted at the foremost position in the lens barrel 6. This structure, in accordance with the reflectivity of the half-mirror 10, functions such that a certain degree of outside ambient light is reflected by the half mirror 10 while the remaining light passes into the lens 5 to be recorded according to taping operation of the video camera 1A. In this regard, it will be noted that a video camera such as described above has a high sensitivity to ambient light levels as compared with a still camera. According to the above-described arrangement of the convex half mirror 10 on the outer side of the lens 5, image recording may be accomplished without difficulty in either ambient outdoor light, or indoors under ordinary room lighting conditions.

Referring now to FIG. 3, the video camera 1A of the present embodiment is shown as utilized for recording images including oneself (hereinbelow; self-photography). As may be seen, the operator holds the camera body 2 via the grip (not shown) in a reversed orientation such that the lens barrel 6 is pointed in the direction of the operator. Since the convex outer surface of the lens 5 is formed as a half mirror, the operator (now also subject) may clearly see the scene which will be recorded reflected in tile half mirror 10, thus the image to be recorded may be composed by viewing the scene as reflected in the half mirror 10 and it is not necessary to use the viewfinder 3. When the operator is satisfied with the scene recorded and wishes to start taping operation, merely pressing the front start/stop button 9 once will begin operation. According to the present embodiment, once the button 9 is initially pressed, recording operation is delayed while the zoom control 7 automatically sets the lens 5 to its widest viewing angle, then normal recording operation will begin. According to this, it is not possible to vary the telescopic properties of the zoom function during self photography, accordingly the process of self photography is greatly simplified and even an inexperienced user may achieve excellent results since the more complex camera functions are disabled at this time.

In addition, the half mirror 10 by which the user composes the scene to be recorded is formed directly over the convex outer surface of the lens 5 which actually receives the input light for recording as a video image. Accordingly, the optical axes of both the lens 5 and the half mirror 10, which essentially acts as a viewfinder in this mode of use, are identical. Thus the user may concentrate on the recording without incongruous distraction induced when the optical axis of the lens 5, by which the actual recording is made, is different from that of the monitoring device. That is, the parallax effect is avoided and the user more easily assumes a more natural, focused feeling. Further, the above may be easily accomplished with inexpensive components which are simple to operate and use of an expensive color LCD monitor or the like, is not required.

Figure 4:
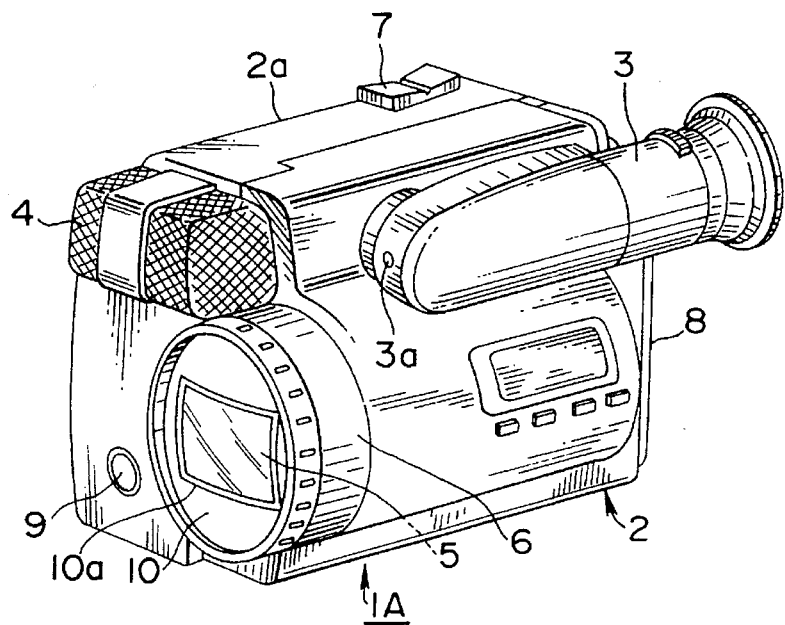
FIG. 4 shows a perspective view of alternative modification of the preferred embodiment of the invention.
Figure 5:
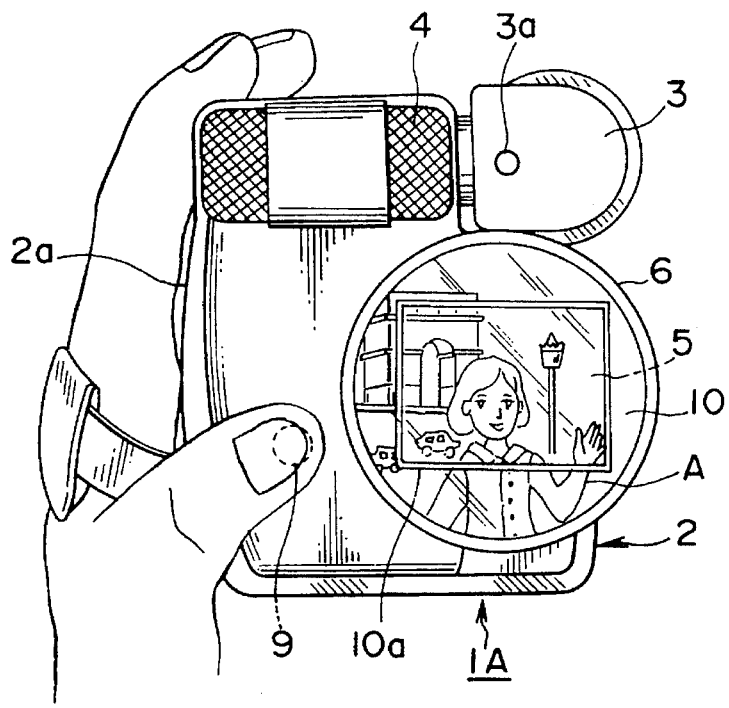
FIG. 5 is a front view of the modified camera of FIG. 4 showing a convex surface mirrored portion thereof.

FIGS. 4 and 5 show a modification of the above-described first embodiment. According to this modification, as seen in the drawings, a window, or frame 10a is marked on the half mirror 10 so as to be easily visible to the user. The dimensions of the frame 10a are established to a scale corresponding to the size of the image actually recorded, accounting for the current setting of the zoom function (which would be the widest setting according to the present embodiment). Thus the image reflected with in the frame 10a of the half mirror 10 would substantially reflect the dimensions of a display area of a standard television set, video monitor, or other display means by which the images recorded by said camera would be displayed. As may be appreciated from FIG. 5, according to provision of the frame 10a, when viewing the reflection in the half mirror 10, the frame 10a may be utilized to more precisely envisage the image as it will actually be recorded, and thus give the user a useful indication of how the self photographed image will appear when displayed on a playback device (i.e. VTR, TV, etc.). The frame 10a is also of use in determining color balance, shadow, and other considerations of particular use when composing video images. The above modification may be applied equally to both still and moving images.

It will be noted that the characteristics of the markings indicating the frame 10a are established such that the level of ambient light input to the lens 5 during taping is sufficient to render the markings invisible on the recorded image when displayed. Thus, the presence of the frame 10a has no influence on the image quality obtained.

Figure 6:
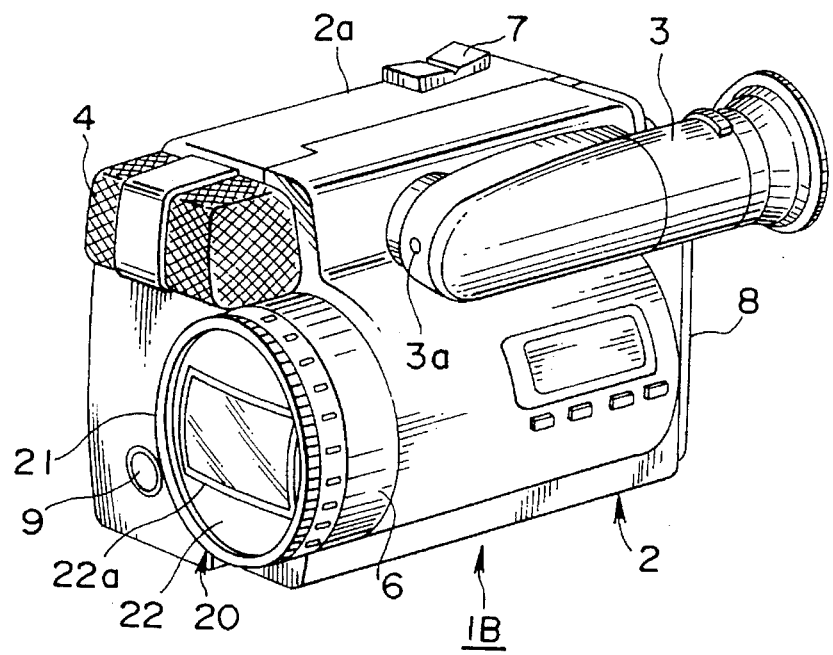
FIG. 6 is a perspective view of a second embodiment of a camera according to the invention.
Figure 7:
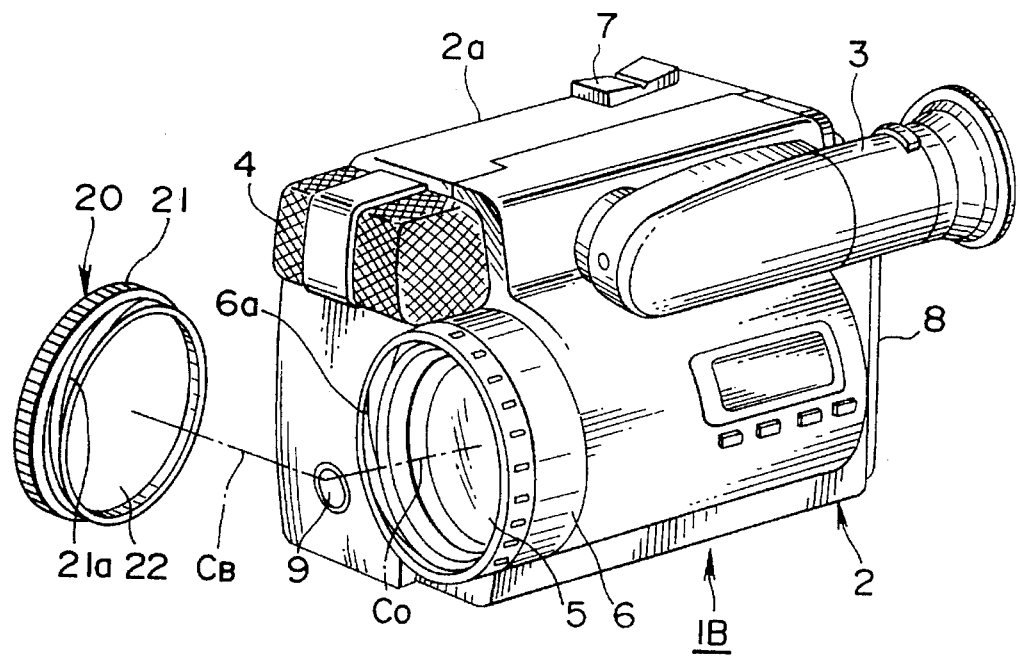
FIG. 7 is a perspective view of the camera of the second embodiment showing detailed structure of a convex mirror portion thereof.
Figure 8:
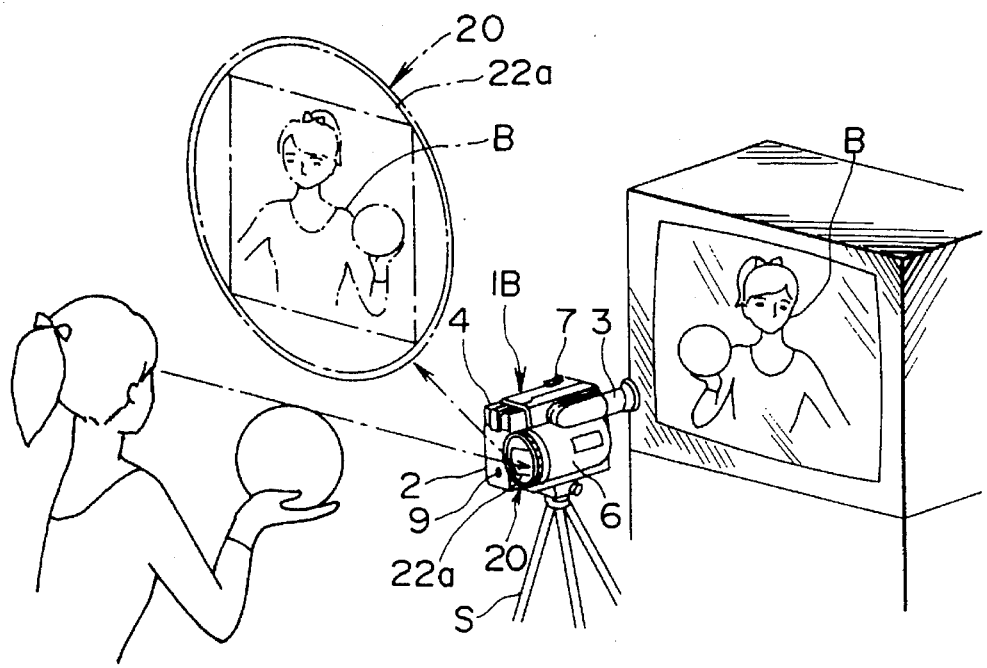
FIG. 8 is an illustration of a camera according to the second embodiment in use for self-photography.

Referring now to FIGS. 6–8, a second embodiment of a video camera 1B according to the invention will be described hereinbelow in detail.

Similarly to the above-described first embodiment, the video camera 1B of the present embodiment comprises a camera body 2 including a VTR 2a and having disposed thereon a viewfinder 3, a microphone 4 and a lens 5. The lens is housed in a cylindrical lens barrel 6 and, a zoom control 7 is also provided.

The rear side of the camera body 2 may include a start stop switch (not shown) as well as a battery pack 8. A grip (not shown) may also be provided The video camera 1B of the present embodiment, also includes a front start/stop switch 9 which functions as previously described in connection with the first embodiment.

At the front side of the viewfinder 3, a battery lamp is provided for indicating that the video camera 1B is operative.

However, according to the present embodiment, the lens 5 is not provided with a reflective element (half mirror) directly. The lens 5 of the video camera 1B is recessed within the lens barrel 6 such that an inner circumference of the lens barrel 6 forward of the lens 5 may be formed with a threaded portion 6a. A circular convex mirror attachment 20 may then be attached to the video camera 1B via threaded engagement between the threaded portion 6a of the lens barrel and a threaded outer circumferential portion 21a projected rearwardly from a mounting ring 21 of the convex mirror attachment 20. The mounting ring 21 mounts a circular convex half mirror 22 therein such that when the convex mirror attachment 20 is attached to the lens barrel 6 via engagement of tile threaded portions 21a and 6a, thus, if the user were to check via the viewfinder 3 of the video camera 1B, it would be appreciated that the optical axis CO of the lens 5 of the video camera 1B and the optical axis CB of the half mirror 22 are commonly aligned.

According to a modification of the convex mirror attachment, as seen in FIGS. 6 and 8, a frame 22a may be marked on the half mirror 22 for reference during self photography. As with the previous embodiment, the dimensions of the frame 22a are established to a scale corresponding to the size of the image actually recorded, thus the image reflected with in the frame 22a of the half mirror 22 would correspond to the dimensions of a display area of standard television set, for example, as pictured in FIG. 8. As will be appreciated from FIG. 8, when viewing the reflection in the half mirror 22 during image recording, the frame 22a will give the subject B (i.e. the camera user) an accurate indication of how the image will appear when displayed on a playback device. For ease of use, tile video camera may, for example, be mounted on a tripod S, during recording the subject B may monitor the scene via the reflection in the half mirror 22 of the convex mirror attachment 20, an example of the monitored reflection being shown in enlarged detail in dot-dash lines in the upper left side of FIG. 8. As may be appreciated, the reflected image within the frame 22a of the half mirror 22 reversely corresponds to the video image displayed on the television monitor at the right side of the figure. As with tile previous embodiment, the light input to the lens 5 during image recording is sufficient to conceal the markings of the frame 22a when the recorded image is displayed.

An additional feature of the second embodiment as set forth above is that, since the lens 5 is recessed to a certain degree within the lens barrel, the threaded portion 6a at the inner circumference may further be utilized to interpose other lenses in front of the lens 5, such as conversion lens (not shown), a wide angle lens (not shown) or a filter (not shown) for modifying the light admitting characteristics of the lens 5. In addition, the convex mirror attachment 20 may still be attached to the front side of the lens barrel such that optical accessories such as noted above may be conveniently interposed between the lens 5 and the convex mirror attachment 20 in such a way the the optical axes of all optical component are precisely aligned.

Thus as with the first embodiment, the video camera 1B of the present embodiment allows the user to carry out self photography without distraction induced by non alignment of the optical axes of the lens 5 and a monitoring device. Parallax is avoided and the subject B may assume a more natural, focused feeling during recording. As noted in connection with tile first embodiment, the above may be easily accomplished with simple, inexpensive components and LCD monitors or the like, are not required.

Figure 9:
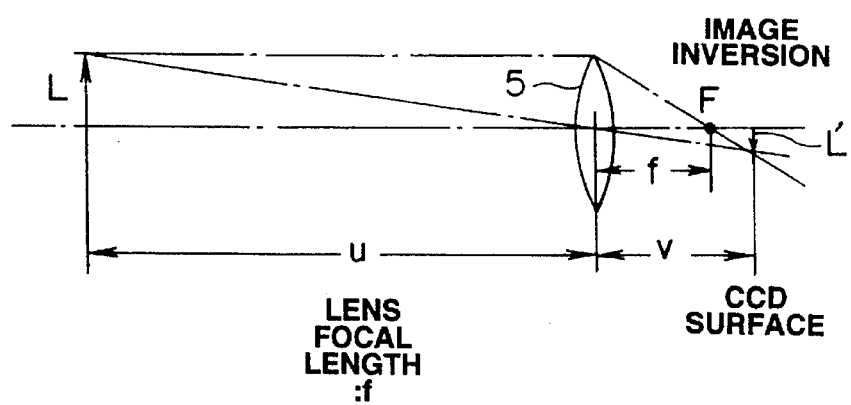
FIG. 9 is an explanatory diagram showing optical characteristics of a lens employed by the camera the invention.
Figure 10:
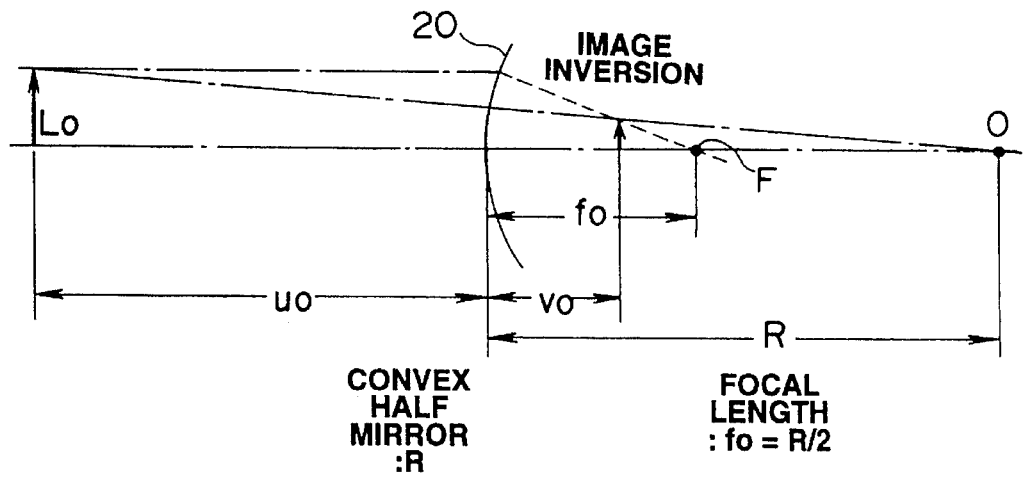
FIG. 10 is an explanatory diagram showing optical characteristics of a convex mirror portion utilized in the second embodiment.

The diagrams of FIGS. 9 and 10, respectively represent the optical characteristics of the lens 5 and the convex mirror attachment 20. As may be seen, a distance present between the lens 5 and a location to which an inverted image L' is transmitted is a quantity v, the location to which the inverted image L' is transmitted may be, for example, a light input surface of a CCD component of an optical system of the video camera 1B. Further, in a direction opposite to the above quantity v, a distance between the lens 5 and a so-called erect image L is a quantity u. A focal length of the lens 5 may be defined as a quantity f. On the other hand, referring to FIG. 10, a distance from the convex mirror attachment 20 to a virtual image present in the described optical system may be defined as a quantity v0, while the distance from the convex mirror attachment 20 to the erect image L0 is a quantity u0, establishing a focal length f0 for the convex mirror attachment 20. Thus magnification quantities m and m0 are established respective for the lens 5 and the convex mirror attachment 20. In light of this, consider the following:

$$v = f/\{1 + (f/u)\} \quad (1)$$

$$v0 = -f0/\{1 + (f0/u)\} \quad (2)$$

$$m = v/u \quad (3)$$

$$m0 = v0/u0 \quad (4)$$

Thus, if u=u0, according to the above equations (1)–(4) it may be said that m/m0=f/f0. The effect of this relation is that the dimension of a frame size of an image input to the convex mirror attachment 20 compared to the frame size of corresponding image formed on the CCD is proportional to the focal lengths of the convex mirror attachment 20 and the lens 5. Thus, if a radius R of the convex mirror attachment 20 is increased, a large reflected image surface is obtained.

Next, with reference to FIGS. 11–17, various modifications of a convex mirror attachment according to the invention will be described.

A first modification is identical in structure to the convex mirror attachment 20 of FIG. 7. However, in the previous construction the half mirror 22 is formed on the surface of a convex transparent element (such as glass, etc.) while provision is allowed for insertion of additional conversion lenses, filters, etc., while, according to this first modification, the half mirror 22 is formed, by vapor deposition or any other suitable means, on a convex surface of the conversion lens, filter, or other optical accessory, directly. Thus, a number of parts is reduced and utilization is simplified.

Figure 11:
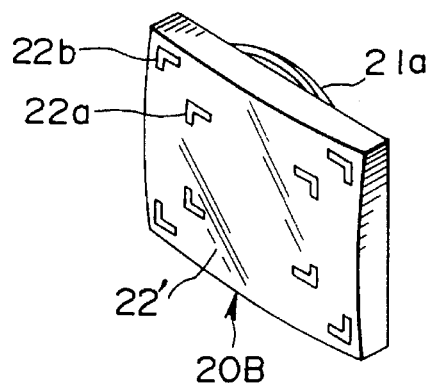
FIG. 11 is a perspective view of a modification showing a second arrangement of the convex mirror portion of the second embodiment.

FIG. 11 shows a second modification of the convex mirror attachment of the invention. This convex mirror attachment 20B features a lightweight rectangular construction in which frame and mirror portions may be integrally formed. The outer surface is convex and is surfaced with a half mirror 22' The frame feature described in relation to the previous embodiments is implemented in this modification as outer L-shaped frame indicators 22b and inner L-shaped frame indicators 22a, thus the entire frame need not be marked while the user is offered two frames of reference during recording, both of which are analagous in shape to a conventional display monitor, thus the user is provided reflected images in a format which is familiar and ease of use is further enhanced. A threaded cylindrical portion 21a is projected from the rear side of the convex mirror attachment 20B having threads formed on the outer circumference so as to engage the threaded portion 6a of the lens barrel of the video camera 1B in the same manner as previously described.

Figure 12:
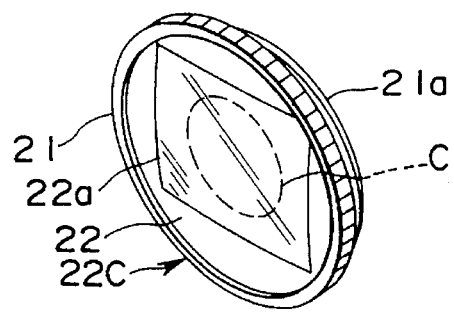
FIG. 12 is a perspective view of a modification showing a third arrangement of the convex mirror portion of the second embodiment.
Figure 13:
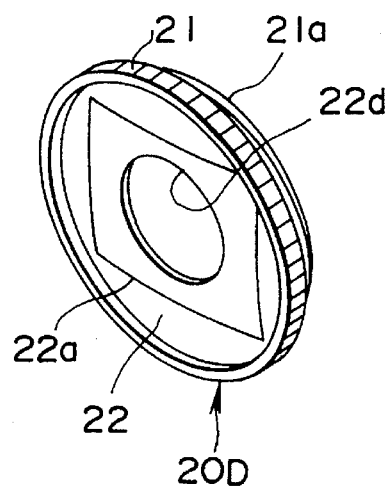
FIG. 13 comprised of FIGS. 13A–13B is a perspective view of a modification showing a fourth arrangement of the convex mirror portion of the second embodiment.
Figure 13:
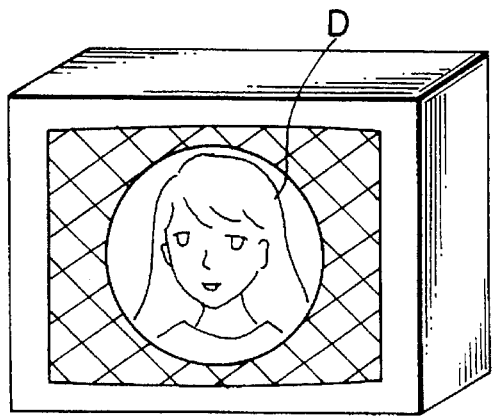
Figure 14:
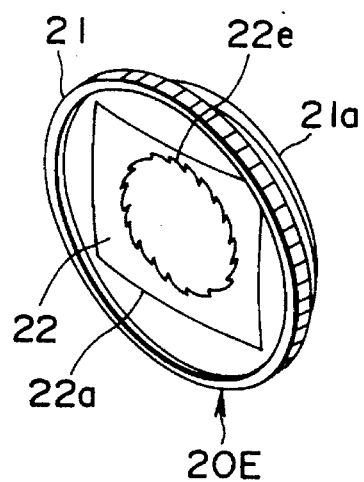
FIG. 14 comprised of FIGS. 14a–14b is a perspective view of a modification showing a fifth arrangement of the convex mirror portion of the second embodiment, FIG.
Figure 14:
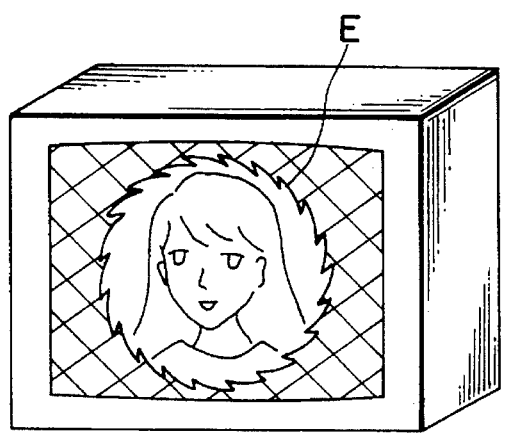
Figure 15:
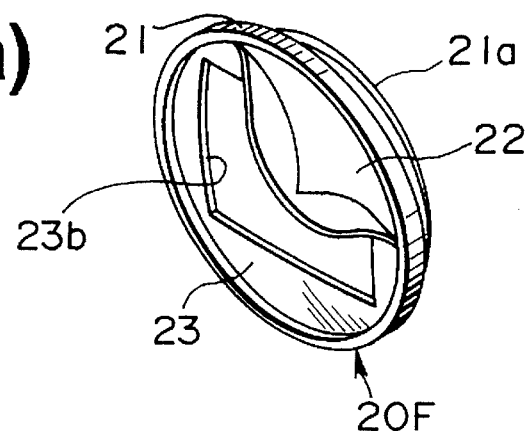
Figure 15:
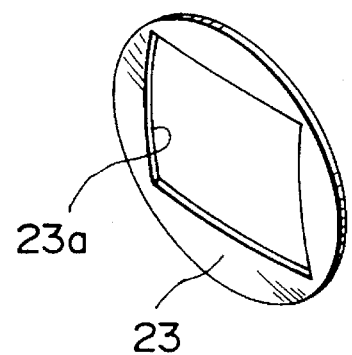
Figure 15:
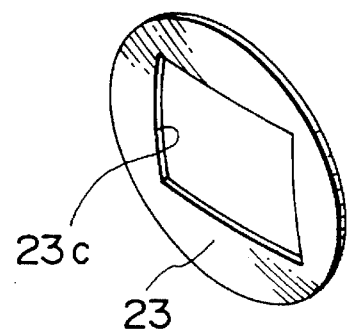
Figure 15:
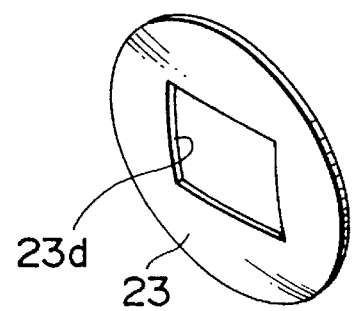

FIG. 12 shows a third modification which is constructed identically to the convex mirror attachment 20 described originally in relation to the second embodiment. According to this modification, a thickness of the reflective coating material used for forming the half mirror 22 is reduced or removed within the bounds of the circular area C of FIG. 12, thus the recorded image will appear brighter in the center portion thereof.

FIGS. 13(a) and 13(b) show a fourth modification of an attachment 20D in which a convex mirror or half mirror portion 22" is mounted in a mounting ring 21 a circular area 22d receives no reflective coating, thus a recorded image D, when displayed, will appear as shown in FIG. 13(b), the applications of this modification may be expanded when combined with the above-described first modification. In other respects, the structure of the attachment is the same as set forth in relation to the second embodiment.

FIGS. 14(a) and 14(b) a shows fifth modification of an attachment 20E in which a convex half mirror portion 22 is mounted in a mounting ring 21 a circular area 22e receives no reflective coating and is formed with a patterned circumference, thus a recorded image D, when displayed, will appear as shown in FIG. 14(b), giving an indefinite focus to the displayed image. In other respects, the structure of the attachment is the same as set forth in relation to the second embodiment.

FIGS. 15(a) 15(b) show variations of a sixth modification of a mirror attachment 20F. The structure of the attachment is the same as originally set forth with a mounting ring 21 retaining a half mirror 22 frame indicators are provided in the form of removable adhesive stickers, or labels, which include a circumferential area 23 and cut-out frame areas 23a–23d. According to this, the frame size of the recorded image may be manually varied according to the requirements of the user, the magnification setting of the video camera, etc. It will be noted that the adhesive frame indicators 23 of this modification may be utilized on many types of camera and is not limited to the video camera 1B of the embodiment.

Referring now to FIGS. 16 and 17, seventh and eighth modifications of the attachment according to the invention are shown. According to these modifications, the features of the invention may be applied to conversion lenses such as a wide angle lens, or other lenses providing a specific photographic effect.

As seen in FIGS. 16(a) and 16(b) an attachment 30 includes a mounting ring 31 and an externally threaded cylindrical portion 31a for attachment to the video camera 1B as previously set forth. The conversion lens 32 is formed with a convex surface 32a upon which a half mirror 33 is formed. In other respects this modification is the same as those previously described.

Referring now to FIGS. 17(*a*) and 17(*b*), a conversion lens (i.e. wide angle) attachment 35 includes a mounting ring 36 and an externally threaded cylindrical portion 36*a* for attachment to a video camera 1B as previously set forth. Although a plurality of lenses are arranged in such wide angle and/or telephoto type attachments, the feature of the invention applies to the frontmost conversion lens 37 which is formed with a concave rear surface 37*a* upon which a half mirror 38 is formed. This construction offers the same utility and advantages as the convex half mirror of the previously described arrangements.

Referring now to FIGS. 18–20, a third embodiment of a video camera 1C according to the invention will be described hereinbelow in detail.

Similarly to the above-described embodiments, the video camera 1C of the present embodiment comprises a camera body 2 including a VTR 2*a* and having disposed thereon a viewfinder 3, a microphone 4 and a lens 5. The lens is housed in a lens barrel 6 and, a zoom Control 7 is also provided.

The rear side of the camera body 2 includes a battery pack 8. A grip (not shown) may also be provided The video camera 1C of the present embodiment, also includes a front start/stop switch 9 which functions as previously described in connection with the first embodiment.

At the front side of the viewfinder 3, a battery lamp may be provided for indicating that the video camera 1C is operative.

According to the present embodiment, the lens 5 is recessed within the lens barrel 6 which is formed in a rectangular configuration such that the lens 5 is framed by a rectangular containment including mounting rail portions 6*b*, 6*b* which project in mutually opposite directions away from the lens 5 comprising the vertical side of the rectangle.

According to this structure, a rectangular convex mirror attachment 40 may then be attached to the video camera 1C via inwardly oriented C-shaped side grooves 41*b*, 41*b* which slidingly engage the mounting rail portions 6*b*, 6*b* of the lens barrel such that the convex mirror attachment 40 is easily slid downward to be attached to the video camera 1C. Detachment may be simply accomplish by upwardly sliding the convex mirror attachment 40. The attachment 40 includes a mounting frame 41 retaining a rectangular half mirror 42 therein having a convex surface contour. When the convex mirror attachment 40 is attached over the lens barrel 6 via sliding engagement of the mounting rails 6*b*, 6*b* and side grooves 41*b*, 41*b* the optical axes of the lens 5 and the half mirror 42 are commonly aligned.

Further, because of the rectangular shape of the half mirror 42, frame markings such as described in connection with the previous embodiments are not necessary.

As will be appreciated from FIG. 20, when viewing the reflection in the half mirror 42 during image recording, the subject C (i.e. the camera user) sees an accurate indication of how the image will appear when displayed on a playback device.

Thus the present embodiment offers all the features and advantages of the previous embodiments in that the video camera 1C of the present embodiment allows the user to carry out self photography without distraction induced by non alignment of the optical axes of the lens 5 and a monitoring device. Parallax is avoided and the subject C may assume a more natural, focused feeling in front of the cameras. As noted in connection with the other embodiments, the above may be easily accomplished with simple, inexpensive components and LCD monitors or the like, are not required.

FIGS. 21 and 22 show a fourth embodiment of a video camera 1D according to the invention as will be described hereinbelow.

Similarly to the above-described embodiments, the video camera 1C of the present embodiment comprises a camera body 2 including a VTR 2*a* and having disposed thereon a viewfinder 3, a microphone 4 and a lens 5. The lens is housed in a lens barrel 6 and, a zoom control 7 is also provided.

The rear side of the camera body 2 includes a battery pack 8. A grip (not shown) may also be provided The video camera 1C of the present embodiment, also includes a front start/stop switch 9 which functions as previously described in connection with the first embodiment.

At the front side of the viewfinder 3, a battery lamp 3*a* may be provided for indicating that the video camera 1C is operative.

According to the present embodiment, the lens 5 is recessed within the lens barrel 6 which is formed in a cylindrical configuration such that an inner circumference of the lens barrel 8 forward of the lens 5 serves to mount a mirror attachment 50. The attachment 50 comprises a lightweight, rectangular case 51 comprising upper and lower casings 52 and 53. Coaxially aligned circular openings 52*a*, and 53*a* are formed respectively in the upper and lower casings 52, 53. A circular half mirror 54 covers the opening 53*a* of the lower casing. The positioning of the openings are determined such that, when the attachment 50 is moumted, the optical axis of the half mirror corresponds to that of the lens 5. Mounted over the half mirror 54 are a pair of semi-transparent fins 56, 56, which comprise a framing portion. The fins have elongate cutout portions 58*b*, 56*b*, and perpendicularly oriented cut-out portions 56*c*, 56*c*, are slidably mounted on a series of pins 55, 55, 57*a*, 57*a*. The pins 55, 55, are projected from the lower casing 53 while the pins 57*a*, 57*a* are projected from a pivot member 57 which is pivotably movable according to movement of the output shaft of a stepping motor 58 which is connected to a control portion (not shown) of the video camera 1D by a control cable 59.

The fins 56, 56 are opposingly positioned L-shaped members having mutually inward facing right angle portions 56*a*, 58*a* such that an open space defined between the two fins 56, 56 is rectangular.

According to the present embodiment, when the user wishes to engage in self photography, the start/stop switch is depressed to begin recording. However, in this case the zoom control 7 is not overridden or disengaged but is active to send a control signal via the cable 59 so as to control the stepping motor 58 in accordance with the degree of magnification determined by the zoom control 7 such that the advantages of the framing feature set out hereinabove in connection with the previous embodiments is available in a continuously variable manner in accordance with the zoom control. As with the previous embodiment, the dimensions of the frame defined between the fins 56, 56 are established to a scale corresponding to the size of the image actually recorded, these dimensions being maintained consistently irregardless of operation of the zoom control 7 of the video camera 1D.

Thus the present embodiment offers all the features and advantages of the previous embodiments in that the video camera 1D of the present embodiment allows the user to carry out self photography without distraction induced by non alignment of the optical axes of the lens 5 and a monitoring device. Parallax is avoided and the subject D may assume a more natural, focused feeling in front of the camera. As noted in connection with the other embodiments, the above may be easily accomplished with simple, inexpensive components and LCD monitors or the like, are not required. Further, the framing feature of half mirror portion 5 is automatically adjusted and such the technical capabilities of the camera are enhanced while operation is kept simple. The half mirror casing 50 may be made to be detachable for added convenience when the camera is not is use.

FIGS. 23–24 relate to a fifth embodiment of a video camera 1E according to the invention will be described hereinbelow in detail.

Similarly to the above-described embodiments, the video camera 1E of the present embodiment comprises a camera body 2 including a VTR 2a and having disposed thereon a viewfinder 3, a microphone 4 and a lens 5. The lens is housed in a lens barrel 6 and, a zoom control 7 is also provided.

The video camera 1C of the present embodiment, also includes a front start/stop switch 9a including a settable self-timer function and a timer indicator lamp 9b For signaling the beginning (and/or end) of image recording.

According to the present embodiment, the lens 5 is set in the lens barrel 6 and a mirror or half mirror 11 (or a Flat mirror is also applicable) is mounted on the front side of the camera body 2 beside the lens 5. This allows the user (subject E) to monitor the composition of scenes in which the subject E does not wish to directly face into the lens 5 during recording. The mirror 11 is rectangular to facilitate framing of scenes in a manner analagous to the Final recorded image.

For self photography, the video camera may be mounted on a tripod S and during recording the subject E may monitor the scene via the reflection in the mirror 11 without looking into the camera lens 5. An example of the monitored reflection is shown in enlarged detail in dot-dash lines in the upper left side of FIG. 23. As may be appreciated, the reflected image within the mirror 11 reversely corresponds to the video image displayed on the television monitor at the right side of the figure.

The video camera 1F of the sixth embodiment is shown in FIG. 25 and comprises a camera body 2 including a VTR 2a and having disposed thereon a viewfinder 3, a microphone 4 and a lens 5. The lens is housed in a lens barrel 6 and, a zoom control 7 is also provided.

In addition, at one side of the lens barrel 6, a hinge 12 is provided which swingably mounts a lens cap 13 which may be opened or closed so as to cover the lens 5. The front surface 14 of the lens cap 13 may be convex and formed with a frame portion 14a thereon. The front surface 14 may be formed according to any of the previous embodiments, that is, as a half mirror, opaque with a transparent frame portion 14a, etc. According to this structure the self photography features and advantages of the invention may by controlled merely be opening or closing the lens cap 13.

The seventh embodiment of the camera 1G of the invention is shown in FIGS. 26–29, and may be favorably applied to a video still camera as well as a conventional video camera. The lens 5 is housed in a lens barrel which is integral with the camera body 2. One side of the camera body 2 is molded as a grip 2b abutted by a start/stop switch 9. A VTR 2b is also integral to the body 2. The camera includes a viewfinder 3' and, referring to FIG. 27, further has a color LCD monitor on the rear side of the camera body 2. The LCD displays the same image as would be visible through the viewfinder. The camera 1G of the present embodiment includes an adaptor 60 which may be installed and/or detached by the user. The adaptor 60 comprises a C-shaped body which snaps over the upper side of the camera body 2 and includes openings 60c, 60d corresponding to the positions of the viewfinder 3 and the lens 5 respectively. Further, at the rear side thereof, the adaptor 60 includes a cut out 60e to expose the eyepiece of the viewfinder 3'. A flat fin portion 60b projects laterally from the top of the adaptor 60 and is fitted, on a front side thereof with a mirror 61 which may be flat or convex and has a frame 61a marked thereon.

Thus, for self photography, the subject G may attach the adaptor and refer to the mirror for an accurate reference as to the composition of the image to be recorded.

For cameras with limited adjustment of the magnification of the lens, the size of the mirror 61 is proportioned to correspond to the largest magnification while the size of the frame 61a corresponds to the size of the smallest magnification.

The camera 1H of FIGS. 29 and 30 show an eighth embodiment according to the invention, the camera 1H is similar in design to the camera 1G of the previous embodiment but may be implemented for use with conventional film rather than electronic image recordal means. The feature of this embodiment is an adaptor 70 which may be installed and/or detached by the user. The adaptor 70 comprises a C-shaped body which snaps over the upper side of the camera body 2 and includes an opening 70a corresponding to the position of the lens 5.

The opening 70a is covered by a mirror 71, which may be flat or convex, having a frame 71a marked thereon.

Thus, for self photography, the subject H may attach the adaptor and refer to the mirror 71 for an accurate reference as to the composition of the image to be recorded.

As with the previous embodiment, in cameras with limited adjustment of lens magnification, the size of the mirror 71 is proportioned to correspond to the largest magnification while the size of the frame 71a corresponds to the size of the smallest magnification. In addition, the image reflected in the mirror 71 will have an optical axis common to that of the lens 5.

The present invention may be applied, for example to a two-way video communication system such as pictured in FIGS. 31 and 32. Put simply, a swivelable monitor 80 would present the image of a person with whom the user would be in communication while the users image would be transmitted to a corresponding monitor at the other person's side via a video camera 1' according to the invention including at least a lens 5' being covered by a half mirror 10' which may include frame indications (not shown). Thus, while viewing the other person on the monitor 80, one could also monitor one's own image via the half mirror 10'.

The present invention may also be implemented on an automatic, or remote controlled panning stand 90 which may be swivelable in left, right, upper and lower directions on which a video camera 1 according to the invention would set in a mounting unit 91. The front of the mounting unit is provided with a circular convex mirror 92 having a crosshair indicator 92a as well as larger and smaller frames 92b, 92c marked thereon. Thus, one could monitor frame composition is several ways during panning operations while engaged in self photography.

Further, it will be noted that, although the above-described embodiments are drawn principally to a video camera, the invention is equally applicable to video still cameras, conventional cameras utilizing chemically based film, movie cameras or any other device utilized for reception and recordal of images on location wherein composition of an image to be recorded is determined according to the visual preferences of the user.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. In a camera having a lens:

a lens cap;

a half reflective mirror included in said lens cap for allowing a person to observe, during self photography, exactly the same image as will be recorded by the camera.

2. A hand-held video camera comprising:

a lens;

a transparent lens cap;

a half reflective mirror included in said lens cap for allowing a person to observe, during self photography, exactly the same image as will be recorded by the camera;

a record button placed at the front of the camera at a location proximate said lens and so arranged to facilitate self photography.

3. A hand-held video camera as set forth in claim 2, further comprising a frame visibly marked on said lens cap to depict the limits within which photography is possible.

4. A hand-held video camera as set forth in claim 3, further comprising means for adjusting the size of said frame.

5. A hand-held video camera as set forth in claim 4, further comprising a zoom lens and wherein said frame size adjusting means is operatively synchronized with the operation of the zoom lens so as to vary in size in accordance with the degree of zooming.

6. An adaptor for a hand-held video camera comprising:

a lens cap;

mirror means included in said lens cap for allowing a person to observe, during self photography, exactly the same image as will be recorded by the camera.

7. An adaptor for a hand-held video camera as set forth in claim 6, wherein said lens is a conversion lens and said half reflective mirror is formed on an external surface.

8. An adaptor for a hand-held video camera as set forth in claim 6, wherein said lens is a conversion lens and wherein said half reflective mirror is formed on an internal surface.

9. In a hand-held video camera having an electronically controlled zoom lens:

a housing;

a half reflective mirror element disposed in said housing;

means for pivotally mounting said housing on a body of a video camera so that said half reflective mirror can be moved into a position directly in front of the electronically controlled zoom lens;

frame means, included in said housing and responsive to the operation of the electronically controlled zoom lens, for limiting the size of the image which is visible in said half reflective mirror in accordance with the degree of zooming.

10. An adaptor for a hand-held video camera having an electronically controlled zoom lens, comprising:

a housing;

a half reflective mirror element disposed in said housing;

means for pivotally mounting said housing on a body of a video camera so that said half reflective mirror can be moved into a position directly in front of the electronically controlled zoom lens;

a frame for visibly indicating limits within which photography is possible, said frame being defined by a pair of apertured blade members; and servo means operatively connected with the pair of apertured blade members and responsive to the operation of the electronically controlled zoom lens in a manner to vary the size of the frame in accordance with the degree of zooming.

* * * * *